April 21, 1959
W. D. LANIER ET AL
2,882,996
COOLING TOWER MIST ELIMINATOR
Filed June 24, 1957
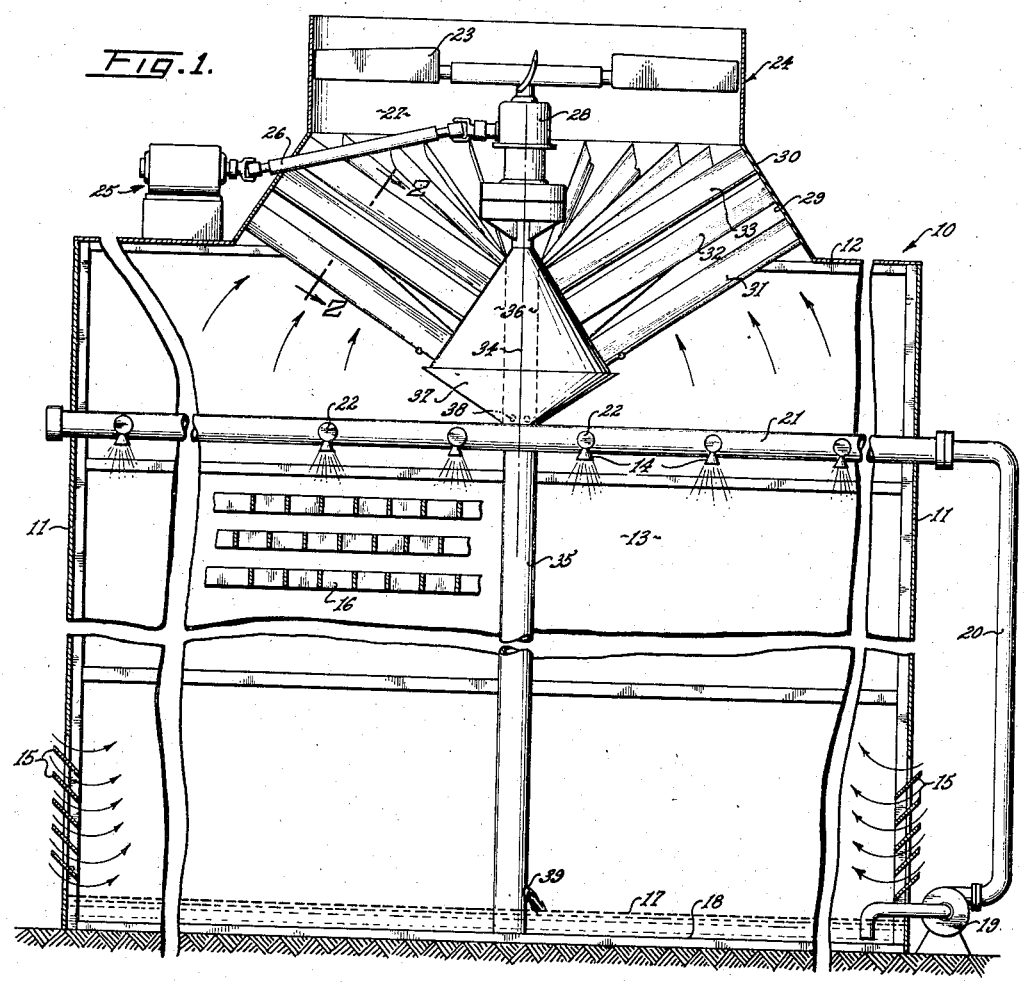
WILLIAM D. LANIER
ROBERT L. SOLNICK
INVENTOR.
BY
ATTORNEY

United States Patent Office 2,882,996
Patented Apr. 21, 1959

2,882,996

COOLING TOWER MIST ELIMINATOR

William D. Lanier, Garden Grove, and Robert L. Solnick, Whittier, Calif., assignors to The Fluor Corporation, Ltd., Los Angeles, Calif., a corporation of California Application June 24, 1957, Serial No. 667,572

24 Claims. (Cl. 183—26)

This invention relates generally to liquid cooling towers wherein sprayed liquid is subject to entrainment by air flowing through the tower in cooling relation to the liquid. More particularly, the invention has to do with improvements in such towers concerning the location and arrangement of baffles operating to remove substantially all the moisture entrainment from the high velocity air stream, and at the same time guiding the latter into the fan in such a way as to maximize the efficiency of tower performance which is functionally related to pressure drop across the baffles, the air flow rate through the tower and the energy input to the fan.

Water cooling towers employing fans rotating in tower stacks to draw air through relatively large size cooling chambers in cooling relation to water sprayed therein, are well known. The cooling chambers of such towers are normally sized large enough to ensure desired water cooling capacity, without objectionable carry-over or loss of water in the form of entrained moisture drawn through the tower by the fan. Mist eliminator baffles closely spaced across the chamber above the spray nozzles function to detrain the moisture from the air, and they function as desired provided the upward air velocities through the baffles are sufficiently low, for example less than five hundred feet per minute.

For the sake of economizing on the use of construction materials required in building a tower to rated capacity, it is desirable to decrease the chamber size, i.e. the lengths and width dimensions; however, such a design change, for a given rate of air throughput, causes increased upward air flow velocity through the mist eliminator baffles, and a point is rapidly reached where the higher velocity air stream begins to strip off and re-entrain the moisture detrained on the baffles, so that excessive carry-over results. That low rates of carry-over are important can be seen from the fact that performance guarantees normally require that less than 0.2% of total circulated water is permissibly lost through carryover.

The present invention has for its general object the provision in an induced draft water cooling tower of a moisture detraining assembly so arranged and designed as to permit a major reduction in the tower chamber size thereby saving materials, without sacrificing the efficiency of tower performance or causing increased loss of moisture in the form of entrainment or carry-over. This object is realized through the use of a moisture detraining assembly including the tower stack, a fan rotating in the stack, and at least two vertically displaced rows of baffles projecting into the high velocity upward air flow under the fan, the baffles being arranged and operating not only to remove entrained moisture as required, but also directing the air flow upwardly into the fan in a spiral course generally opposite the direction of fan rotation so that the resultant upward discharge from the stack has a minimum spiral flow component, with correspondingly minimized associated spiral flow energy content. Since the baffles effectively handle all the relatively high velocity flow discharged through the stack for example at representative flow rates between 1800 and 2200 feet per minute, the tower chamber size can be substantially reduced, for the air velocity in the chamber is no longer critical from the standpoint of causing moisture re-entrainment therein.

Efficient tower performance from a competitive standpoint requires the use of at least two vertically displaced rows of baffles spaced about a vertical axis under the fan, with the lower baffles being sufficiently angled not only to receive impingement of moisture entrainment, but also to direct the upward flow against upper baffles for detrainment purposes. While increased angling of the baffles from the vertical ensures desired detrainment, it argues against performance efficiency, since the rate of air flow that can be drawn through the fan for given fan energy input is thereby decreased. Also, too little deviation of the lower row or rows of baffles from the vertical, while increasing fan efficiency, prevents sufficient impingement of entrainment and separation of moisture. Experiment shows that at least two and preferably three rows of oppositely angled baffles are necessary to achieve the desired moisture detrainment and high efficiency characteristics, with the lower rows of baffles removing the great bulk of moisture and the topmost row operating in an essentially "dry" condition, i.e. without there being sufficient accumulation of water on the baffle surfaces as a film or otherwise to result in water being stripped off by the high velocity upward air flow.

Other aspects of the invention include the provision of air-foil shaped baffles extending at certain critical angles as respects the vertical and one another, with the downward facing baffle sides being recessed for reception and draining of detrained moisture, the flow cascading off the baffles in such manner as to be directed against the baffle undersides at locations above the recesses. Also, central support means for the baffles is provided, enabling them to project centrally and downwardly toward a central receptacle for draining detrained water, the support also extending centrally upwardly to mount the fan and gear drive so that the space between the fan and baffles therebelow is essentially open permitting free and unobstructed reverse spiraling of the upward flow into the fan, for maximum efficiency.

These and other features and objects of the invention, as well as the details of an illustrative embodiment, will be more fully understood from the following detailed description of the drawings, in which:

Fig. 1 is a vertical section taken through the cooling tower and the moisture detraining assembly at the top of the tower;

Fig. 2 is a section taken through the baffles on line 2—2 of Fig. 1;

Fig. 3 is a section taken through a representative baffle enlarged to show its shape; and Fig. 4 is a perspective view of the Fig. 3 baffle.

In Fig. 1 the induced draft water cooling tower 10 has side walls 11 and a top 12 forming an enlarged vertically extending cooling chamber 13 within which water is sprayed from nozzles 14 in the top portion of the chamber. Air entering the chamber 13 between spaced louvers 15 below the tower side walls 11 is displaced upwardly through grid packing 16 in the chamber, and over which the sprayed water cascades downwardly to be cooled by the rising air. Water collecting at 17 on the tower floor 18 is recirculated to the nozzles by a pump 19, the water flowing through a riser pipe 20 and into a main header 21 extending transversely through the upper portion of the tower chamber and connecting with branch conduits 22 from which the water is supplied to the nozzles 14.

Air is induced to rise upwardly within the chamber 13 by a fan 23 rotating within the tower stack 24, the stack having decreased cross section in relation to the chamber 13 so that the air flows upwardly through the stack at a higher velocity than is characteristic air flow in the chamber. The fan is suitably driven by a motor assembly 25 mounted on the tower top 12, a drive shaft 26 connected with the motor and extending into the stack opening 27, and a central gear assembly 28 connected with the shaft 26 and driving the fan. Air enters the stack 27 through an opening 29 formed by a frusto-conical venturi section 30 of the stack, acting to guide the flow upwardly from the chamber 13 to the stack opening 27, so as to avoid sudden flow pressure drops and associated disturbances including air turbulence and undesirable friction losses.

Carried by the venturi are three vertically displaced rows of baffles, those in the lower, middle and upper rows being given the numbers 31, 32 and 33 respectively. All of the baffles are spaced about a vertical axis 34 extending centrally with respect to the stack, and they project from the venturi section 29 downwardly and centrally toward the axis 34 with the lowermost row of baffles 31 extending downward into the upper portion of chamber 13 directly below the fan. As a result, all of the upward air flow passes successively through the baffles 31, 32 and 33 and then upwardly into the open space between the upper baffles and the fan. This space is maintained substantially completely open for purposes as will appear, by avoiding fan supports extending laterally or transversely within the stack, and instead supporting the fan, gear 28 and the lower ends of the baffles 31, 32 and 33 by means including a central vertical tubular column 35 seated on the floor of the tower as shown, or on the water distribution system in the upper portion of the chamber. A frustro-conical support 36 carried by the column 35 directly mounts the lowermost ends of the baffles or vanes as shown in Fig. 1, and an inverted frustro-conical receptacle 37 carried by the column 35 receives water draining from the support 36. From the receptacle the water conveniently passes into the tubular column through openings 38 therethrough, the water then falling downward within the column out of contact with the rising air in the chamber 13, and ultimately flowing through another opening 39 near the bottom of the column and into the water 17 standing at the base of the tower. Collected water may alternatively be dumped downwardly from the receptacle 37.

The baffles in each of the rows are elongated and they extend in planes inclined from the vertical in such a way that, as shown in Fig. 2, the baffles in successive rows are oppositely angled. As a result, the upward air flow from the chamber 13 having increasing velocity as it approaches the stack is caused to cascade upwardly off the successive rows of baffles for efficient detrainment of moisture carried upward by the rising air stream. Due to the fact that the tower size, i.e. the spacing between the side walls 11 of the tower, is substantially decreased in relation to a conventional tower having mist eliminator baffles extending completely across the upper portion of the chamber, the upward air flow in the chamber 13 itself is relatively high, so that substantial quantities of moisture approaching 10% of the total water sprayed downward in the chamber are entrained by the rising air. This fact imposes a heavy burden of de-entrainment capacity upon the baffle assembly. As an example, whereas conventional towers operate with the air flow in the chamber 13 no higher than five hundred feet per minute, the present tower can operate with air velocities in the main spray chamber as high at 2200 feet per minute, the actual air velocity of course being determined by the cross sectional area of the chamber.

As shown in Figs. 2 to 4 the baffles have air foil shape and extend in planes directed toward the downward facing sides of the baffles in the next above row. The baffles are furthermore angled in such a way that the flow cascading off the lowermost baffles 31 impinges on the middle row of baffles 32 at points above lengthwise extending moisture receiving recesses 40 formed in the undersides of the baffles. These recesses are generally of concave shape as shown, and are located near the leading edges 41 of the baffles so as to be below the underside portions 42 against which the cascading flow impinges, in order that moisture detrained from the flow by such impingement may flow downward by gravity over the smoothly curved undersurfaces 43 of the baffles and then into the recesses 40 out of the direct path of air flow rising upwardly between the baffles. Once in the recesses, the moisture drains downwardly and lengthwise of the baffles onto the frustro-conical shield 36 and then into the receptacle 37 as described above.

Referring again to the angling of the baffles from the vertical, those in the top row are angled in a direction opposite to that of fan rotation so as to direct the air flow upwardly in a spiral course such that the resultant upward air flow in the stack above the fan has a minimum spiral component. In other words, the discharge from the stack is desirably as near to vertical in direction as practical so that minimum energy input to the air flow by the fan is wasted, such wastage being represented by spiral flow downstream of the fan having no useful purpose. In this respect it is important that the space between the upper row of baffles and the fan be essentially unobstructed so that the upward flow cascading off baffles 33 will rise toward the fan in a uniform manner permitting highest efficiency upward blowing of the flow by the fan.

At least two rows of baffles are necessary in order that the flow may be caused to sharply cascade off the upper row for efficient detrainment of moisture. If one row only is utilized, the upward flow tends to pass between the baffles in that row since the flow is induced to spiral before it reaches the baffles, and in a direction such that it passes between then without adequately cascading or impinging against the baffle undersides so as to cause sufficient detrainment of moisture. For most efficient operation the top row of baffles should remain essentially dry, ensuring that no moisture will be carried over through the stack. By essentially dry is meant a wetted condition of the baffle undersides, without there being a film of water thereon capable of being sheared off or otherwise removed by the high velocity air flow causing reentrainment. In order that the top row operate in this condition, three rows of baffles, as shown in Figs. 1 and 2, are sufficient, the middle and lower rows receiving the great majority of moisture detrainment.

If the baffles are angled too sharply from the vertical, the pressure drop to which the rising air stream will then be subjected causes decreasing efficiency of tower operation, especially from the standpoint of increased horsepower input to the fan. On the other hand, if the lower row or rows of baffles are angled too slightly from the vertical, the efficient of tower operation from the standpoint of energies required will increase; however, the amount of water carried over or lost through the tower stack will increase beyond acceptable levels.

Substantially all of the entrained water is removed from the upward air stream by the baffles, and the tower operates at near maximum efficiency when the baffles in the upper row are equally angled at between 20 and 40° from the vertical, and preferably at 30° therefrom. Furthermore, the baffles in the center row should be equally angled at between 0 and 30° from the vertical and preferably at 20° therefrom. Baffles in the bottom row should be equally angled at between 20 and 40° from the vertical and preferably at 30° therefrom. A further condition experimentally shown to be true consists in the requirement that the baffles in the upper and center rows should be angled within the above ranges so that the sum of the upper and center row baffle angles lies between 40 and 50°, and the same is true with respect to the sum of the angles of baffles in the center and bottom rows. Thus, when the baffles in the upper and center rows are angled from the vertical at 20° and 30° respectively, the sum of these angles equals 50°, which is within the 40 and 50° range.

Since the baffles in successive rows are oppositely angled, as seen in Fig. 2, and since the top row baffles are angled in a direction opposite to that of fan rotation so as to direct the air flow upwardly in a spiral course such that the resultant upward air flow in the stack above the fan has a minimum spiral component, it is found that the major lengthwise extents of the fan blades and baffles have chordwise extending cross sections substantially normal to the lengthwise extents of the blades and baffles respectively; also, the chordwise extending cross section of the fan blades and top row baffles are angled in the same direction with respect to vertical lines therethrough and the chordwise extending cross section of the top and second row baffles are angled in opposite directions with respect to vertical lines therethrough; finally, the fan rotates so that each fan blade lower edge passes in sequence over the upper and lower edges of each top row baffle, the fan blade lower and upper edges being leading and trailing respectively, as seen in Fig. 1. As used herein, the terms "chordwise" and "chord" made in reference to the cross sections of the blades and baffles shall be understood to mean the distance of a straight line between the leading and trailing edges of the blades and baffles.

We claim:

1. In an induced draft water cooling tower having a vertically extending cooling chamber within which water is passed downwardly in contact with upwardly displaced air, a moisture detraining assembly including a stack above said chamber, the lower portion of the stack being enlarged and tapering upwardly above the chamber to the reduced upper remainder of the stack thereby forming an enlarged stack entrance zone directly overlying the chamber, a fan within the stack directly overlying said stack entrance zone and operating to displace air from said chamber upwardly through the stack with velocity in said entrance zone less than air velocity in the upper remainder of the stack and greater than air velocity in the tower chamber, and at least two vertically separated rows of baffles spaced about a vertical axis and projecting lengthwise inwardly toward said axis and downwardly relative to said stack entrance zone into the upward air flow under the fan, said baffles having lower faces angled from the vertical so as to receive upward impingement of the entrained moisture and to direct the air flow upwardly into the fan in a spiral course opposite the direction of fan rotation, the major lengthwise extents of said blades and baffles underneath the blades during fan rotation having chordwise extending cross sections substantially normal to the lengthwise extents of said blades and baffles respectively, the chordwise extending cross sections of the fan blades and top row baffles being angled in the same direction with respect to vertical lines therethrough and the chordwise extending cross sections of the top and second row baffles being angled in opposite directions with respect to vertical lines therethrough, said fan rotating so that each fan blade lower edge passes in sequence over the upper and lower edges of each top row baffle, whereby liquid entrainment moving at relatively high velocity impinges upon baffles below the level of said top row during deflection of the air by the baffles and spiraling of the flow about said axis is reduced by the fan and baffles.

2. In an induced draft water cooling tower having a vertically extending cooling chamber within which water is passed downwardly in contact with upwardly displaced air, a moisture detraining assembly including a stack above said chamber, the lower portion of the stack being enlarged and tapering upwardly above the chamber to the reduced upper remainder of the stack thereby forming an enlarged stack entrance zone directly overlying the chamber, a fan within the stack directly overlying said stack entrance zone and operating to displace air from said chamber upwardly through the stack with velocity in said entrance zone less than air velocity in the upper remainder of the stack and greater than air velocity in the tower chamber, and at least two vertically separated rows of baffles spaced about a vertical axis and projecting lengthwise inwardly toward said axis and downwardly relative to said stack entrance zone into the upward air flow under the fan, lower baffles having lower faces angled from the vertical to receive upward impingement of entrained moisture separating it from the flow and upper baffles having lower faces angled from the vertical to direct the air flow upwardly into the fan in a spiral course opposite the direction of fan rotation, the major lengthwise extents of said blades and baffles underneath the blades during fan rotation having chordwise extending cross sections substantially normal to the lengthwise extents of said blades and baffles respectively, the chordwise extending cross sections of the fan blades and top row baffles being angled in the same direction with respect to vertical lines therethrough and the chordwise extending cross sections of the top and second row baffles being angled in opposite directions with respect to vertical lines therethrough, said fan rotating so that each fan blade lower edge passes in sequence over the upper and lower edges of each top row baffle, whereby liquid entrainment moving at relatively high velocity impinges upon baffles below the level of said top row during deflection of the air by the baffles and spiraling of the flow about said axis is reduced by the fan and baffles.

3. In an induced draft water cooling tower having a vertically extending cooling chamber within which water is passed downwardly in contact with upwardly displaced air, a moisture detraining assembly including a stack above said chamber, the lower portion of the stack being enlarged and tapering upwardly above the chamber to the reduced upper remainder of the stack thereby forming an enlarged stack entrance zone directly overlying the chamber, a fan within the stack directly overlying said stack entrance zone and operating to displace air from said chamber upwardly through the stack with velocity in said entrance zone less than air velocity in the upper remainder of the stack and greater than air velocity in the tower chamber, and at least two vertically separated rows of baffles spaced about a vertical axis and projecting lengthwise inwardly toward said axis and downwardly relative to said stack entrance zone into the upward air flow under the fan, lower baffles having lower faces angled from the vertical to receive upward impingement of entrained moisture separating it from the flow and upper baffles having lower faces angled from the vertical to direct the air flow upwardly into the fan in a spiral course opposite the direction of fan rotation, said lower baffles directing the flow toward said upper baffles, the major lengthwise extents of said blades and baffles underneath the blades during fan rotation having chordwise extending cross sections substantially normal to the lengthwise extents of said blades and baffles respectively, the chordwise extending cross sections of the fan blades and top row baffles being angled in the same direction with respect to vertical lines therethrough and the chordwise extending cross sections of the top and second row baffles being angled in opposite directions with respect to vertical lines therethrough, said fan rotating so that each fan blade lower edge passes in sequence over the upper and lower edges of each top row baffle, whereby liquid entrainment moving at relatively high velocity impinges upon baffles below the level of said top row during deflection of the air by the baffles and spiraling of the flow about said axis is reduced by the fan and baffles.

4. In an induced draft water cooling tower having a vertically extending cooling chamber within which water is passed downwardly in contact with upwardly displaced air, a moisture detraining and flow straightening assembly including a stack above said chamber, the lower portion of the stack being enlarged and tapering upwardly above the chamber to the reduced upper remainder of the stack thereby forming an enlarged stack entrance zone directly overlying the chamber, a fan within the stack directly overlying said stack entrance zone and rotating to displace air from said chamber upwardly through the stack with velocity in said entrance zone less than air velocity in the upper remainder of the stack and greater than air velocity in the tower chamber, and three vertically separated rows of baffles spaced about a vertical axis and projecting lengthwise inwardly toward said axis and downwardly relative to said stack entrance zone into the upward air flow under the fan so that said flow passes between the baffles in said rows, said baffles having lower faces angled from the vertical so as to receive upward impingement of the entrained moisture and to direct the air flow upwardly into the fan in a spiral course opposite the direction of fan rotation, said top row of baffles remaining at all times essentially dry, the major lengthwise extents of said blades and baffles underneath the blades during fan rotation having chordwise extending cross sections substantially normal to the lengthwise extents of said blades and baffles respectively, the chordwise extending cross sections of the fan blades and top row baffles being angled in the same direction with respect to vertical lines therethrough and the chordwise extending cross sections of the top and second row baffles being angled in opposite directions with respect to vertical lines therethrough, said fan rotating so that each fan blade lower edge passes in sequence over the upper and lower edges of each top row baffle, whereby liquid entrainment moving at relatively high velocity impinges upon baffles below the level of said top row during deflection of the air by the baffles and spiraling of the flow about said axis is reduced by the fan and baffles.

5. In an induced draft water cooling tower having a vertically extending cooling chamber within which water is passed downwardly in contact with upwardly displaced air, a moisture detraining and flow straightening assembly including a stack above said chamber, the lower portion of the stack being enlarged and tapering upwardly above the chamber to the reduced upper remainder of the stack thereby forming an enlarged stack entrance zone directly overlying the chamber, a fan within the stack directly overlying said stack entrance zone and rotating to displace air from said chamber upwardly through the stack with velocity in said entrance zone less than air velocity in the upper remainder of the stack and greater than air velocity in the tower chamber, and at least two vertically separated rows of baffles spaced about a vertical axis and projecting lengthwise inwardly toward said axis and downwardly relative to said stack entrance zone into the upward air flow under the fan so that said flow passes between the baffles in each row, the baffles in successive rows being vertically staggered in spaced apart relation and having lower faces oppositely angled upwardly and away from the vertical so as to receive upward impingement of the entrained moisture and to direct the air flow upwardly into the fan in a spiral course opposite the direction of fan rotation, the major lengthwise extents of said blades and baffles underneath the blades during fan rotation having chordwise extending cross sections substantially normal to the lengthwise extents of said blades and baffles respectively, the chordwise extending cross sections of the fan blades and top row baffles being angled in the same direction with respect to vertical lines therethrough and the chordwise extending cross sections of the top and second row baffles being angled in opposite directions with respect to vertical lines therethrough, said fan rotating so that each fan blade lower edge passes in sequence over the upper and lower edges of each top row baffle, whereby liquid entrainment moving at relatively high velocity impinges upon baffles below the level of said top row during deflection of the air by the baffles and spiraling of the flow about said axis is reduced by the fan and baffles.

6. In an induced draft water cooling tower having a vertically extending cooling chamber within which water is passed downwardly in contact with upwardly displaced air, a moisture detraining and flow straightening assembly including a stack above said chamber, the lower portion of the stack being enlarged and tapering upwardly above the chamber to the reduced upper remainder of the stack thereby forming an enlarged stack entrance zone directly overlying the chamber, a fan within the stack directly overlying said stack entrance zone and rotating to displace air from said chamber upwardly through the stack with velocity in said entrance zone less than air velocity in the upper remainder of the stack and greater than air velocity in the tower chamber, and at least two vertically separated rows of baffles spaced about a vertical axis and projecting lengthwise inwardly toward said axis and downwardly relative to said stack entrance zone into the upward air flow under the fan so that said flow passes between the baffles in each row, the baffles in successive rows being vertically staggered in spaced apart relation and having lower faces oppositely angled upwardly and away from the vertical so as to receive upward impingement of the entrained moisture and to direct the air flow upwardly into the fan in a spiral course opposite the direction of fan rotation, the lower sides of at least some of the baffles against which said entrainment impinges being inwardly recessed near the lowermost edges of the baffles so that the detrained moisture drains downwardly along said lower sides and collects in said recesses out of the direct path of said upward flow, the major lengthwise extents of said blades and baffles underneath the blades during fan rotation having chordwise extending cross sections substantially normal to the lengthwise extents of said blades and baffles respectively, the chordwise extending cross sections of the fan blades and top row baffles being angled in the same direction with respect to vertical lines therethrough and the chordwise extending cross sections of the top and second row baffles being angled in opposite directions with respect to vertical lines therethrough, said fan rotating so that each fan blade lower edge passes in sequence over the upper and lower edges of each top row baffle, whereby liquid entrainment moving at relatively high velocity impinges upon baffles below the level of said top row during deflection of the air by the baffles and spiraling of the flow about said axis is reduced by the fan and baffles.

7. In an induced draft water cooling tower having a vertically extending cooling chamber within which water is passed downwardly in contact with upwardly displaced air, a moisture detraining and flow straightening assembly including a stack above said chamber, the lower portion of the stack being enlarged and tapering upwardly above the chamber to the reduced upper remainder of the stack thereby forming an enlarged stack entrance zone directly overlying the chamber, a fan within the stack directly overlying said stack entrance zone and rotating to displace air from said chamber upwardly through the stack with velocity in said entrance zone less than air velocity in the upper remainder of the stack and greater than air velocity in the tower chamber, and at least two vertically separated rows of baffles spaced about a vertical axis and projecting lengthwise inwardly toward said axis and downwardly relative to and below said stack entrance zone into the upward air flow under the fan so that said flow passes between the baffles in said rows, the baffles in successive rows being vertically staggered in spaced apart relation and having lower faces oppositely angled upwardly and away from the vertical so that the flow cascades upwardly off successive rows of baffles causing detrainment of the moisture thereon, the uppermost row of baffles directing the air flow upwardly into the fan in a spiral course opposite the direction of fan rotation, the major lengthwise extents of said blades and baffles underneath the blades during fan rotation having chordwise extending cross sections substantially normal to the lengthwise extents of said blades and baffles respectively, the chordwise extending cross sections of the fan blades and top row baffles being angled in the same direction with respect to vertical lines therethrough and the chordwise extending cross sections of the top and second row baffles being angled in opposite directions with respect to vertical lines therethrough, said fan rotating so that each fan blade lower edge passes in sequence over the upper and lower edges of each top raw baffle, whereby liquid entrainment moving at relatively high velocity impinges upon baffles below the level of said top row during deflection of the air by the baffles and spiraling of the flow about said axis is reduced by the fan and baffles.

8. The invention as defined in claim 7 in which lower baffles extend in planes directed toward the downward facing sides of upper baffles.

9. The invention as defined in claim 8 comprising elongated baffles having their length axes tilted from the horizontal.

10. The invention as defined in claim 9 in which said baffle under sides receive impingement of said moisture, said sides containing lengthwise extending recesses near the lowermost edges of the baffles receiving detrained moisture draining down said sides.

11. The invention as defined in claim 10 in which the recessed baffles taper upwardly throughout their extent above said recesses.

12. The invention as defined in claim 11 in which said lower baffles extend in planes directed upwardly toward the downward facing sides of upper baffles above said recesses.

13. The invention as defined in claim 10 including means receiving said detrained moisture draining lengthwise of the baffles in said downward tilted recesses.

14. The invention as defined in claim 7 in which the baffles are openly spaced below the fan so that said spiral flow into the fan is essentially unobstructed.

15. The invention as defined in claim 13 in which said baffles are downwardly tilted toward said axis.

16. The invention as defined in claim 15 including means supporting the downward extending ends of said baffles below said unobstructed space.

17. The invention as defined in claim 16 comprising vertically extending means supporting the fan and said baffle ends.

18. The invention as defined in claim 16 in which the upward extending baffle ends are carried by the enlarged and tapered lower portion of the stack.

19. The invention as defined in claim 9 comprising three rows of baffles.

20. The invention as defined in claim 19 in which the upper row baffles are equally angled at between 20 and 40 degrees from the vertical.

21. The invention as defined in claim 20 in which the baffles in the center row are equally angled at between 0 and 30 degrees from the vertical.

22. The invention as defined in claim 21 in which the sum of said upper and center row baffle angularity is between 40 and 50 degrees.

23. The invention as defined in claim 21 in which the bottom row baffles are equally angled at between 20 and 40 degrees from the vertical.

24. The invention as defined in claim 23, in which the sum of said center and bottom row baffle angularity is between 40 and 50 degrees.

References Cited in the file of this patent

UNITED STATES PATENTS

| Number | Name | Date |
|---|---|---|
| 1,929,410 | Coey | Oct. 10, 1933 |
| 2,136,003 | Coey | Nov. 8, 1938 |
| 2,356,192 | Yingling | Aug. 22, 1944 |
| 2,437,484 | Simons | Mar. 9, 1948 |
| 2,497,389 | Ahrens | Feb. 14, 1950 |
| 2,596,782 | Moore | May 13, 1952 |
| 2,672,328 | Mart et al. | Mar. 16, 1954 |
| 2,780,306 | Boyle et al. | Feb. 5, 1957 |
| 2,788,084 | Holzknecht | Apr. 9, 1957 |